(12) United States Patent
Palazzi

(10) Patent No.: US 11,272,799 B2
(45) Date of Patent: Mar. 15, 2022

(54) DRINKING STRAW WITH INTERNAL COATING

(71) Applicant: UNISTRAW CORP., Pepper Pike, OH (US)

(72) Inventor: Kendall Norman Palazzi, Singapore (SG)

(73) Assignee: UNISTRAW CORP., Pepper Pike, OH (US)

( * ) Notice: Subject to any disclaimer, the term of this patent is extended or adjusted under 35 U.S.C. 154(b) by 0 days.

(21) Appl. No.: 16/887,525

(22) Filed: May 29, 2020

(65) Prior Publication Data

US 2021/0369026 A1    Dec. 2, 2021

(51) Int. Cl.
| | | |
|---|---|---|
| *A47G 21/18* | (2006.01) | |
| *C08L 5/00* | (2006.01) | |
| *C09D 105/00* | (2006.01) | |

(52) U.S. Cl.
CPC .......... *A47G 21/18* (2013.01); *A47G 21/183* (2013.01); *C08L 5/00* (2013.01); *C09D 105/00* (2013.01)

(58) Field of Classification Search
CPC .. A47G 21/18; A47G 21/183; A47G 19/2266; C08L 5/00; C09D 105/00; B65D 2517/0049; B65D 77/28; B65D 77/283
See application file for complete search history.

(56) References Cited

U.S. PATENT DOCUMENTS

| | | | | |
|---|---|---|---|---|
| 3,615,595 | A * | 10/1971 | Guttag | A23L 27/74 426/85 |
| 4,981,468 | A | 1/1991 | Benefiel et al. | |
| 8,409,643 | B2 | 4/2013 | Gaonkar et al. | |
| 2004/0109932 | A1 * | 6/2004 | Chen | A23G 3/36 426/660 |
| 2005/0106188 | A1 | 5/2005 | Sedaghat Kerdar et al. | |
| 2006/0286214 | A1 * | 12/2006 | Weiss | A23L 19/09 426/104 |
| 2010/0221389 | A1 * | 9/2010 | Frenken | A23L 33/16 426/74 |
| 2012/0294989 | A1 * | 11/2012 | Picolli | B65D 17/4012 426/135 |
| 2014/0084077 | A1 | 3/2014 | Knight | |
| 2015/0250702 | A1 * | 9/2015 | Schwartz | A61K 8/73 514/769 |
| 2015/0282507 | A1 * | 10/2015 | Rizvi | A23L 19/01 426/561 |
| 2018/0133108 | A1 | 5/2018 | Palazzi | |

FOREIGN PATENT DOCUMENTS

GB    2 366 178    3/2002

OTHER PUBLICATIONS

European Search Report & Written Opinion, EP Patent Application No. 15171534.9, dated Oct. 21, 2015.
International Search Report & Written Opinion, International Patent Application No. PCT/EP2016/063138, dated Aug. 23, 2016.

* cited by examiner

*Primary Examiner* — Cody J Lieuwen
(74) *Attorney, Agent, or Firm* — Casimir Jones, S.C.; Tanya A. Arenson

(57) ABSTRACT

A drinking straw comprising an elongate tubular body of an insoluble material having an internal coating comprising a matrix containing an active agent dispersed within the matrix, the body sized to allow a carrier liquid to be drawn therethrough such that passage of the carrier liquid causes the matrix to release the active agent into the carrier liquid to be consumed by a drinker. The matrix comprises partially hydrolysed guar gum, possibly in combination with an acid and/or modified cellulose. The active agent includes sweetener, flavour, a nutrient and/or a pharmaceutical and optionally colour. The coating is prepared by mixing the matrix with water to form a paste or syrup and is then used to coat the inside surface of a drinking straw to a thickness of less than 1 mm. Liquid drawn through the straw dissolves or breaks down the coating, releasing the active agent into the liquid for consumption.

9 Claims, No Drawings

DRINKING STRAW WITH INTERNAL COATING

INTRODUCTION

The present invention relates to drinking straws having an internal coating which rapidly dissolves, breaks down or erodes in a fluid being drawn through the straw in use. While the coating may typically include vitamins, stimulants, probiotics and/or pharmaceutical products, it may additionally or alternatively include other agents such as sweeteners and flavourings.

BACKGROUND TO THE INVENTION

Filled straws are readily available in supermarkets around the world for adding flavour to beverages. The most commonly available straws are filled with pellets containing sweeteners and flavourings, for example strawberry or chocolate. The straws can be used to drink milk, with the pellets gradually dissolving in the milk as it is drawn through the straw, flavouring and sweetening the milk. The advantage of such straws are that a range of flavours take up less space, and they have a longer shelf life than flavoured milks, and are easier to use and more controlled than milk flavouring powder which has to be dissolved into milk to make a drink. Such straws can also be used to flavour water.

Other types of filled straws have also been proposed, in particular straws in which a dissolvable coating is adhered to the inside surface of the straw. As liquid is drawn through the straw in use, the coating dissolves into the fluid.

U.S. Pat. No. 4,921,713, in the name of Fowler, describes a straw for imparting flavour to otherwise neutral liquids, such as water or milk. Various methods of providing a material which dissolves in the liquid are described. These include a separate chamber containing flavouring material, granular material held within the body of the straw by a pair of sponges, and a flavouring material adhered to the inside of the straw.

US 2003/168772 in the name of Palaniappan describes a method of manufacturing an internally coated straw, in which the internal coating is applied to the inside of the straw as it exits the extruder in which it is formed. The coating material includes a matrix agent, which may be a maltodextrin or alginate, into which flavouring is added.

US 2011/143005, in the name of Gaonkar, also describes a drinking straw in which the inside of the straw is coated with a material that will flavour and sweeten a beverage drawn through the straw. The coating comprises an adhering agent and a powdered agent. The adhering agent includes lipids, medium chain triglycerides oils, emulsifiers, and mixtures thereof. The powder can include edible acids, edible bases, sweeteners, flavourings, vitamins, minerals, colorants, sensate agents, carotenoids, antioxidants, polyphenols, phytonutrients and mixture thereof.

A problem with all of these coatings is that the flavour they impart to the beverage is quite weak. Otherwise they are simply uneconomical to produce as a commercial product.

US 2006/0286214, in the name of Sanford Weiss et al, describes an edible drinking straw comprising spirally wound layers of fruit film. The layers may be adhered together with a zein solution. This straw can be used to suck fluid into a user's mouth and as the fluid passes through the straw part of the straw dissolves imparting some flavour to the fluid. This will result in loss of structural integrity in the straw and once this has happened the remaining straw material can be dissolved into a fluid or eaten directly.

US 2005/0106188, in the name of Kerdar et al, describes a filled drinking straw in which the filling is retained within the straw by means of barrier devices which may be in the form of a plug or a mesh. These allow fluid to pass through the straw, dissolving the filling material, but retain any undissolved filling material within the straw. Other types of filled straw, for example EP1509096, are known in which the filling is provided in pellets and is retained in the straw by means of filters.

The provision of barrier means or filters adds additional steps to the manufacturing process, adding time and cost. In addition, the barrier means or filters, unless integral to the straw, could become dislodged and represent a choking risk. In addition, failure of a filter, i.e. the creating of a larger aperture than intended, could result in the contents of the straw passing into the user's mouth undissolved, again representing a choking risk.

One of the objects of the invention is to provide a filled straw avoiding the use of barrier or filtration means.

US 2004/0109932, in the name of Chen et al, describes a coated drinking straw in which the coating comprises 40 to 99.99% of a food grade acid. The composition may also include a surface tension reducing agent, a plasticizer, a bulk agent and water. Coating may be via co-extrusion, spraying or dipping. A second coating may be provided in the form of a powder comprising further food grade acid, sugar, fizzing agents, colorants, probiotics, vitamins, herbs, and flavouring agents. This powder can adhere to the sticky surface of the acid coating.

More recently the use of a modified cellulose based matrix has been described in WO 2016/198515. This material is very effective in providing an internally coating drinking straw that imparts flavour to a beverage drawn through the straw and which progresively dissolves into the beverage over the time is takes to consume the beverage. Typically these straws are used with iced drinks, drinks containing small ice crystals and other very thick and viscous beverages. Such beverages are generally consumed over the course of approximately 10-15 minutes, and consist of 600-1000 ml of beverage. Drinking straws having an internal lining based on a modified cellulose matrix are able to provide flavour to the drink during the whole course of its consumption. Indeed, the dissolution rate of the internal coating is such that it cannot be dissolved in a rapidly consumed beverage. It is also believed that the ice crystals in the iced drinks whith which these straws are typically used, brush against the coating during drinking aiding dissolution. Examples of the modified cellulose matrix include hydroxypropylmethylcellulose, hydroxypropylcelluose, or methylcellulose, but other modified cellulose matrices may also be used, including mixtures thereof. While this is very effective for beverages that are consumed slowly and using a significant volume of liquid, particularly liquid containing particles, it is not effective for flavouring beverages that are consumed quickly and with a smaller volume of liquid.

When a consumer is thirsty, for example after exercise or on a hot day, they may wish to consume a beverage quickly, and directly from the fridge. Such a drink may be 100-500 ml in volume and may take approximately 2 minutes to consume. A drinking straw having a modified cellulose based internal coating will not dissolve sufficiently rapidly into a beverage to provide sufficient flavour to the beverage and to be essentially fully consumed at the same rate as the beverage. This is particularly important if the internal coating contains a medicament or supplement or probiotic, for example a vitamin or mineral or combination thereof. Again, the consumer will wish to consume the active agent quickly, and typically with a fridge cold beverage, for example water.

There are many difficulties to overcome in the identification of a coating agent that can adhere to the inside of a drinking straw. Firstly, aqueous materials generally shrink on drying. This has significant benefit for use as an external coating, for example on the outside of a pellet or tablet, as the shrinkage draws the coating more tightly to the pellet or tablet. However, this is very disadvantageous for use in the coating of the inside of something, including a drinking straw, as the shrinkage will draw the coating material away from the surface of the straw. This will result in a lack of adherence between the coating material and the drinking straw, and thus failure of the straw. Secondly, drinking straws are usually made from hydrophobic materials to which aqueous material do not generally adhere, exacerbating the problem. Most drinking straws have typically been made from polypropylene, which is hydrophobic, or indeed other materials which are hydrophobic or have a hydrophobic coating. More drinking straws are now being made from compostable materials, including polylactic acid (PLA) or polybutylene succinate (PBS). These are also hydrophobic materials to which aqueous material do not adhere well.

It is desirable to provide an internally coated drinking straw which can release an active ingredient into a rapidly consumed beverage.

It is also desirable to provide a straw having an improved internal coating.

An object of the invention is to provide alternative drinking straws containing material which dissolves into a liquid drawn through the straw on use, and methods of making such straws.

SUMMARY OF THE INVENTION

A drinking straw is provided comprising an elongate body having an internal coating comprising a gum which adheres to the inside of the body and holds one or more agents to be consumed by a user.

DETAILS OF THE INVENTION

Accordingly, the present invention provides a drinking straw comprising an elongate tubular body of an insoluble material having an internal coating comprising matrix and an active agent, the active agent being dispersed throughout the matrix, the body sized to allow a carrier liquid to be drawn therethrough such that passage of the carrier liquid causes the matrix to release the active agent into the carrier liquid to be consumed by a drinker, wherein the matrix comprises a partially hydrolysed gum.

In particular embodiments, the present invention provides a drinking straw comprising an elongate tubular body of an insoluble material having an internal coating comprising matrix and an active agent, the active agent being dispersed throughout the matrix, the body sized to allow a carrier liquid to be drawn therethrough such that passage of the carrier liquid causes the matrix to release the active agent into the carrier liquid to be consumed by a drinker, wherein the matrix comprises partially hydrolysed guar gum (PHGG).

In use, a user places one end of the straw into a container holding a beverage and draws the beverage through the straw by suction, releasing the active agent from the gum matrix into the beverage for consumption.

Gums for use in the invention are preferably soluble in cold water, meaning water at 5 degrees Celsius or lower.

Gums are staple commercial products available from many sources. Suitable gums are water-soluble, branched polysaccharides, and as such are structurally and functionally distinct from cellulose and cellulose derivatives, as cellulose are linear polysaccharides. Gums are also distinct from inulins, which are not stable at low pH and are not suitable for the invention. Gums may also be referred to as dietary fibres and are typically used as such.

Partially hydrolysed guar gum is a known, staple commercial product available from many sources. It is a water-soluble, branched polysaccharide and available with varying degrees of hydrolysis. In general, gums for use in the invention are hydrolysed up to 30%, suitably up to 20%. The degree of hydrolysis in measured conventionally and usually indicated by a % fibre content.

In examples below a PHGG having approximately 85% or more fibre content was used; this PHGG was found to be stable at low pH and soluble in cold water.

In more detail, gums are polysaccharides of natural origin, capable of causing a large increase in a solution's viscosity, even at small concentrations. Some gums are either soluble or partially soluble in water at ambient temperatures, while other are not soluble but will combine with water to swell. In the food industry they are used as thickening agents, clarifying agents, gelling agents, emulsifying agents, and stabilizers.

Gums are most typically used as thickeners and stabilisers in foods and beverages. This may be for example in meat products, ice-cream, salad dressings, confectionery, beverages, jams, cheese, cosmetics and toothpastes.

Guar gum is widely used in the food industry as a stabiliser in frozen fruit products, icing, glazes and fruit drinks. It is also used as a binder in meat products, baked products, cream cheese and ice-cream. Additionally, it is sometimes used to give body and consistency in cosmetics and toothpaste. Guar gum, also known as guaran, is the galactomannan of the endosperm of guar seeds.

Partially hydrolysed guar gum (PHGG) is typically produced by the partial enzymatic hydrolysis of guar gum. The gum is a neutral polysaccharide consisting of a mannose backbone chain with single galactose side units occurring on almost two out of every three mannose units. The average molecular weight is about 25,000 Daltons. Hydrolysed guar gum is used as a soluble fibre in many fibre supplements and prebiotic dietary supplements. PHGG is used in foods for particular suspension, emulsification, anti-stalling, ice crystal control and reduced fat baked goods, and as mentioned is available commercially from various sources.

The gum matrix for the invention is formed as a thick aqueous paste or syrup which can adhere to the internal surface of the straw. Once it has been applied to the internal straw wall is optionally dried to remove excess water content. More preferably, the gum matrix is formulated to be non-drip; once applied such a matrix adheres to the internal straw wall without dripping or flowing and hence both does not drip and also does not flow so as to accumulate in vertically lower areas of the straw.

It has also been found that including an acid in the matrix increases the adhesion to the straw internal wall. Thus in embodiments of the invention, the matrix comprises the partially hydrolysed gum and an acid. In examples below we have found that including an acid increased adherence between the PHGG and the hydrophobic wall of the drinking straw. The quantity of acid may be up to 50% w/w, suitably from 10 to 45% w/w, preferably from 20 to 40% and more preferably from 25 to 35%. A preferred quantity of acid in the matrix, used in examples below, is about 30%.

The acid prevents over drying of the coating, retaining plasticity. However, the presence of too much acid can be deleterious to the coating. First, if too much acid is present, the coating may not dry sufficiently to enable storage. Toxic moulds can grow on food products having a water activity of 0.66 or higher. It is therefore important to ensure that the water activity in the dried coating can be reduced below this level. Another factor is that a high acid level, i.e. a low pH, may also result in the degradation of certain active agents. Thus the quantity of acid is in part dependent on the matrix and in part on the active agent(s) in the coating.

For use in an internally coated drinking straw, the acid may be a food acid. Preferred examples of suitable acids include citric acid, malic acid, tartaric acid, ascorbic acid. The preferred acid is critic acid. While other acids may be used, such as acetic acid, they are likely to result in an unpleasant taste and so are likely to be avoided.

For improved ease of handling, the PHGG may be mixed with a modified cellulose. This modified cellulose may be an alternative to the acid but will usually be in addition to the acid. Preferably the modified cellulose will be selected from hydroxypropyl methylcellulose, hydroxypropyl cellulose, methyl ethyl cellulose, methyl cellulose and carboxymethylcellulose or a combination thereof. All of these modified celluloses are approved for use in food use and as such have been given food additive numbers E464, E463, E465, E461 and E466. The preferred modified cellulose is hydroxypropyl methylcellulose.

In embodiments of the invention, therefore, the matrix comprises (a) the hydrolysed gum and (b) (i) the acid, or (ii) the modified cellulose or (iii) both the acid and the modified cellulose.

The use of a modified cellulose as a matrix in an internally coated straw has been described in WO 2016/198515 as discussed above. While this is effective, the coating releases the active agent over a prolonged period of time, meaning that it is not suitable for beverages that need to be consumed quickly. This is particularly the case where the beverage is fridge or ice cold.

A combination of modified cellulose and PHGG can be used to provide internally coated drinking straws in which the coating release their active agent over a range of time periods and temperatures. Typically, the coating can be provided having a release time between 2 and 20 minutes by varying the proportions of these elements. The thickness of the coating is also relevant to the release time. However, very thick coatings, typically of more than 2 mm will be avoided, as such thick coatings are difficult and time consuming to dry.

Where the matrix is exclusively or almost exclusively modified cellulose, the release time can be between 8 and 20 minutes. Where the matrix is exclusively or almost exclusively PHGG, possibly including acid, the release time can be between 1 and 10 minutes. Where a combination of modified cellulose and PHGG is used, possibly in combination with acid, a release time of 1-10 minutes can be achieved depending on the proportions.

The ratio of modifed cellulose:PHGG may be between 1:5 and 1:25, preferably between 1:10 and 1:20 and more preferably between 1:15 and 1:20.

In order to achieve a fast release time, a higher proportion of PHGG may be used. For example a ratio of 1:6 of modified cellulose of PHGG give a release time of approximately 3-5 minutes. Typically a ratio of 1:15 of modified cellulose:PHGG may result in an internaly coated straw having a release timeof 1-3 minutes.

Where a combination of PHGG and modified cellulose is used at a ratio of 15:1, the proportion of acid will typically be 30%.

In embodiments of the invention, therefore, the matrix comprises
 (a) 50-250 parts by weight of the hydrolysed gum,
 (b) 0-20 parts by weight of the modified cellulose, and
 (c) 0-50 parts by weight of the acid.

In further embodiments of the invention the matrix comprises:
 (a) 50-250 parts by weight of the hydrolysed gum,
 (b) 0-20 parts by weight of the modified cellulose, and
 (c) 10-40 parts by weight of the acid.

In further embodiments of the invention the matrix comprises:
 (a) 50-250 parts by weight of the hydrolysed gum,
 (b) 4-20 parts by weight of the modified cellulose, and
 (c) 10-40 parts by weight of the acid.

In further particular embodiments of the invention the matrix comprises
 (a) about 100 parts by weight of the hydrolysed gum,
 (b) 4-20 parts by weight of the modified cellulose or 5-15 parts by weight of the modified cellulose, and
 (c) 0-50 parts by weight of the acid or 10-40 parts by weight of the acid or 20-35 parts by weight of the acid.

Usually the active agent will include a nutritional supplement, including herbal extracts, vitamins, minerals, amino acids, fatty acids, probiotics and/or pharmaceutical substances. Additionally, or alternatively, sweetening and flavouring materials may also be included, and colorants may also be included. In a further alternative, the active agent may be formulation to provide an energy drink, typically containing a stimulant, such as caffeine, and B vitamins. In such compositions it is important the water content be low as certain vitamins, and in particular B vitamins can degrade in the presence of water. Amino acids generally also require a low water content as these compounds may degrade in the presence of high moisture levels.

Flavouring materials can include additional acids, including fumaric acid.

The water content of the coating may be relevant to the stability of the active agent. Typically, the coated straw will be dried to remove additional water and reduce the water content. Usually the straws will have a water content of less than 5%, preferably less than 3% and most preferably less than 1% by weight.

Advantageously, the composition, when dried, will have a water activity of less than 0.6, and preferably less than 0.5, and more preferably less than 0.4.

Many pharmaceutical compounds can be provided in a form which may be held within the matrix and released into the liquid as the matrix rapidly breaks down or dissolves on passage of the liquid through the straw. The compounds may dissolve into the liquid, or may be suspended, but will be drawn into the user's mouth to be ingested. This may provide a more convenient form for some patients to take certain medications, as an alternative to swallowing tablets. Such formulations may also include sweetening or flavouring agents.

The active agent may also include nutritional compounds, which again may dissolve into the liquid or be suspended as the matrix rapidly dissolves into liquid drawn through the straw. Again this can provide a convenient way for such compounds to be taken.

Usually the active agent will include at least one sweetener or flavouring agent.

The matrix also functions as a protective coating over the actives once it is dried on the inside of the straw. This assists in protecting some of the more sensitive actives from moisture and oxygen in the atmosphere, even where the atmosphere around the finished and packaged straw is not an artificial or controlled atmosphere.

The proportions of the matrix and the active agent may vary contingent on the active agent and the volume of liquid in which it is desired that the coating will dissolve. Typically, a coating may comprise (dry weight) a ratio of matrix:active of approximately 65:35. For example the ratio of matrix:active may be between 80:20 and 20:80, or between 80:20 and 40:60. In embodiments, the ratio is between 70:30 and 30:70. In embodiments, the ratio is between 70:30 and 45:55. In embodiments, the range is between 60:40 and 50:50.

The coating may comprise (dry weight) 50-80% matrix, with 50-20% active agent. Preferably the matrix will comprise 60-70% matrix and 40-30% active agent.

The coatings can rapidly release the active agent in a predetermined volume of liquid, which will depend on the active agent and the user. Typically, the coating will be designed to release the active agent or disperse in 100-1000 ml of liquid. Preferably the coating will be designed disperse in 100-500 ml of liquid, and most preferably in 100-300 ml of beverage.

In some examples, particularly the coating may be designed to release the active agent or disperse in a relatively small volume of liquid, typically 100-150 ml, so that they can be consumed quickly and easily by the user, who may be ill or may wish to consume the active quickly.

The thickness of the coating will also affect the dissolution of the coating. Thicker coatings will typically take longer to dissolve (at the same dryness level). Coatings will typically be applied to a thickness of up to 1 mm, e.g. 0.01-1 mm, more typically up to 0.7 mm, e.g. 0.05 to 0.7 mm. Usually the coating will have a thickness of up to 0.5 mm, preferably up to 0.25 mm. The most preferred thickness for the coating, used in a specific example below, is substantially 0.05-0.2 mm.

The combination of the thickness of the coating and the proportion and composition of the matrix can be altered to vary the dissolution time and the strength of the active agent in the consumed beverage, as discussed above.

The present invention also provides a method of preparing a drinking straw having an at-least partially coated internal portion, the method comprising the steps of:
providing a drinking straw of an insoluble material;
providing a matrix as defined in the first aspect plus the active agent(s) to be dispersed therein, and mixing with water to form a syrup or paste;
applying the syrup or paste as a coating to an internal surface of the drinking straw; and
drying the coating.

As described below, in embodiments, the method comprises providing a matrix and one or more active agents, wherein the matrix comprises a partially hydrolysed gum, and mixing these with water to form a syrup or paste—which syrup or paste is used to provide the coating on the inside of the straw. The matrix material and one or more active agents may be mixed together and then the mixture combined with water or they may be all combined and mixed in a more or less single step.

In some embodiments the coating is suitably prepared as a syrup to enable workability in processing equipment and adherence to the inside of the straw. In other embodiments it is prepared as a paste, typically a thick paste. It is also preferably formulated to be non-drip so as to stay in place while drying, and not to run. The matrix will generally dissolve in the water, as will some of the active agents, depending on their composition. However, due to the quantity of water used, the mixture will be a paste or syrup solution.

The coating may be prepared by mixing the coating with water and heating the mixture to form a paste or syrup. The active may be added at the elevated temperature or the paste/syrup may be cooled before the active agent is added. Alternatively, the coating may be prepared by mixing the gum with water at ambient temperature and stirring to form a syrup or paste. Typically, the syrup or paste may have a consistency of thick cream, whereby it can support its own weight and thus will not drip or run, in particular when spread on a surface.

In order to automate the process, however, the coating will generally be prepared as a syrup with properties meeting the requirements to flow when in bulk whilst still being relatively non-drip and with limited flow once coated onto the internal surface of the straw.

Typically, an approximately equal weight of water to dry weight of the matrix will be used. For example, the ratio of coating (dry weight):water may be between 20:80 and 80:20 or between 30:70 and 70:30, preferably between 45:55 and 60:40 and most preferably between 50:50 and 60:40.

A particularly suitable matrix for rapid dissolution will include 7.5 g PHGG, 0.5 g modified cellulose and 3 g acid in 15 g water.

Depending on the active agent and the volume of liquid into which the coating is designed to dissolve, typically 1-10 g, preferably 3-9 g and more preferably 5-8 g, of active agent will be added to the syrup.

As discussed above, the matrix will preferably include a food acid. It has also been found that including an acid in the active agent increases the adhesion between the PHGG (and modified cellulose) and the hydrophobic wall of the drinking straw. The quantity of acid may between 20 and 40% w/w.

As explained elsewhere, the acid prevents over drying of the coating, retaining plasticity and various acids may be used.

In addition, the active agent will often include sweetener, for example steviol glycosides (stevia), or sugars including glucose and/or fructose, and may also include flavourings, for example fruit flavours, chocolate flavours, vanilla flavours. Colorants may also be included. Usually the active agent will also include pharmaceutical compounds and/or nutritional compounds, including vitamins and minerals, and possibly fatty acids, amino acids, and/or phytochemicals. Additionally, or alternative agents may include herbal extracts.

The proportions of the matrix and the active agent may vary contingent on the active agent and the volume of liquid in which it is desired that the coating will suspend or dissolve to form a suitable syrup or paste. Typically, a coating may comprise (dry weight) a ratio of matrix:active of approximately 60:40. For example the ratio of matrix:active may be between 80:20 and 20:80 or between 75:25 and 25:75 or between 75:25 and 40:60, preferable between 70:30 and 45:55, and most preferably in the range of between 65:35 and 50:50.

The coating may comprise (dry weight) 40-75% matrix, with 60-25% active agent. Preferably the matrix will comprise 45-65% matrix and 55-35% active agent.

Once the coating has been formed, it is used to at least partially coat the inside of a straw. Generally, the straw will be made of plastic, typically polypropylene, polylactic acid (PLA) or polybutylene succinate (PBS), although other types of plastic, for example polyethylene, or PET may be used. Metal or glass may also be used. Advantageously the straw may be provided as recyclable or compostable.

The coating may be applied by spraying the coating onto the inside of the straw. Alternatively, it may be made by dipping the straw into the coating and wiping the excess off the outside.

Preferably the coating is applied using a mandrel, having a head 0.01 mm-1 mm smaller than the internal diameter of the straw. A predetermined amount of the coating is placed on the end of the mandrel which passed down the straw, depositing the coating as a thin layer around the internal circumference of the straw. In an alternatively the mandrel may be provided with a hollow body with an outlet on the head, the head having larger diameter than the body. A predetermined amount of coating can be pumped through the body to the head as the mandrel is passed down the straw. As the mandrel is returned out of the straw, the head smooths the coating evenly onto the inside of the straw. The relative size of the internal diameter of the straw and the diameter of the head of the mandrel determining the thickness of the coating applied.

The coating may be applied along the full length of the straw. In the alternative the coating may be applied to a portion of the length of the straw only. For example, the coating may be applied to a middle section of the straw only, with no coating being applied adjacent one or both ends of the straw. A 10-30 mm end of the straw may be without coating. When the coating is applied using a spray, both ends of the straw may be without a coating. When a mandrel is used, typically one end only will be without coating. Alternatively, the coating may be applied the full length of the straw and then removed from one or both ends, for example by washing or wiping.

The coating may also be applied to a portion of the straw to achieve a specific geometry relative to the beverage to be consumed. This may mean applied to the upper half of the straw for a coating that does not sit in the beverage being consumed or alternatively applied to the lower half of the straw for a coating that gives an improved result by sitting immersed in the beverage being consumed. In straws where the coating is applied unevenly, i.e. mostly in one half, usually the straw will be marked in some way to indicate to a user which end of the straw should be place in the beverage, and which should be used to drink through. This may be providing the straw with a flat end, possibly a rolled end, for drinking through, and an angled end to be placed in the beverage. Alternatively, the end to be placed in the drink may be flared. In a further alternative the outside of the straw may be provided with the indication, for example writing or colour coding.

The more of the internal surface of the straw is coated, the more capacity to have higher levels of actives within the straw. Typically, the coating will be applied to at least 50%, preferably at least 70% of the internal surface area of the drinking straw, preferably between 70 and 90% of the surface, and most preferably between 75 and 85% of the internal surface.

Once the coating has been applied, the coating is usually dried before the straw is packaged. Typically, this is achieved by passing a stream of relatively cool, dry air, for example dry, room temperature air, through the straw. Alternatively, coated straws may be passed through a moderately heated environment, or a flow of moderately heated air may be used to effect drying of the coating. Importantly, the air is not so hot as to cause melting of the straw or degradation of the active agent. Alternatively, the coating may be dried by passing a stream of chilled dry air through the straws. This may happen at a refrigerated temperature. This mode of drying may be advantageous when dealing with heat sensitive actives.

In may be advantageous to rotate the straw while applying the coating, and/or while drying the coating. This may assist in providing an even coating and achieving an even and complete drying of the coating.

Once dried the coating will typically have a water content of less than 5%, preferably less than 3% and most preferably less than 1% by weight. Typically, the dry coating will have a water activity of 0.6 or less, preferably 0.5 or less and more preferably 0.4 or less.

After the drying, the straws are typically packaged, either singly or in small numbers, typically 1-5, in a moisture impervious packaging material, to prevent the coating absorbing moisture from the atmosphere. In some cases the atmosphere within this package will be artificially controlled to be free of moisture and/or oxygen in order to prolong the shelf life of the active ingredient.

EXAMPLES

The invention is now illustrated in specific examples below.

Example 1

Drinking Straw with Cherry Flavoured Coating

A coating for a drinking straw was prepared as follows:
15.0 g of partially hydrolysed guar gum was dissolved in 20.0 g of water at ambient temperate to produce a syrup.

To this syrup 4.0 g of cherry flavour, 4.1 g of citric acid, 2.0 g of stevia sweetener and 0.5 g of red colour was added and the composition was mixed.

Drinking straws 180 mm long and 8 mm in diameter made from polylactic acid were provided and each straw was coated with 0.52 g of the composition, resulting in an internal coating having a thickness of 100 μm along its entire length. The straws were then dried in a low temperature dryer for approximately 3 hours, resulting in straws having a coating of 0.30 g. The coating was firmly and uniformly adhered to the inside of the straw.

The final straws were able to provide cherry flavour to 400 ml of fridge cold water (4-5° C.), consumed over 2.5 minutes. Once consumed, there was no residue on the inside of the straw, nor in the beverage container.

Example 2

Drinking Straw with Energy Formulation 7.5 g of PHGG and 0.5 g of hydroxypropyl methylcellulose was mixed with 15.0 g water to form a paste. Into this 3.0 g citric acid, and 6.0 g caffeine were added.

Drinking straws as described above were coated with 0.6 g of the coating having a thickness of 125 μm along its full length. The straws were then dried in a low temperature drier, until the water activity was 0.4, at which point the coating weighed 0.34 g. The coating formed an even layer across the entire internal surface of the drinking straw and appeared to be firmly adhered thereto.

The final straws were able to be consumed with 450 ml of fridge cold water (4-5° C.), consumed over 2-2.5 minutes. Once consumed, there was no residue on the inside of the straw, nor the beverage container.

Example 3

Drinking Straw with Energy Formulation and Cherry flavour

The coating was prepared by mixing 7.5 g of partially hydrolysed guar gum and 0.5 g hydroxypropyl methylcellulose in 15.0 g of water at ambient temperature. To this 6.0 g of caffeine, 3.0 g of L-theanine (an extract from green tea and certain other plants), 2.0 g of cherry flavour, 2.0 g of citric acid, 1.0 g stevia sweetener and 0.2 g of red colour were added and this mixture stirred well.

Drinking straws made from white polylactic acid were coated with 0.53 g of this mixture, giving a coating thickness of 50 μm. Thus each straw contained 100 mg of caffeine and 50 mg of L-theanine. The straws were then dried in a low temperature drier resulting in a film mass of 0.41 g, which was firmly adhered to the straw.

The straws were used to consume 170 ml of chilled water (4-5° C.) over 2 minutes. At this point, there was no residue remaining on the straw nor in the beverage container. The white colour of the straws hid any perceived flaws in the coating due to the particulate nature of the actives.

Example 4

Drinking Straw with Black Cohosh Extract Coating 7.5 g of partially hydrolysed guar gum and 0.5 g methyl cellulose was mixed into 15.0 g of water at ambient temperature to form a thick syrup. To this 5.1 g of black cohosh extract (an herbal remedy for symptoms associated with the menopause having a bitter taste), 2.0 g of lemon flavour, 2.0 g of citric acid, 1.0 g stevia sweetener and 0.2 g of yellow colour were added to the paste and stirred well.

Drinking straws made from polypropylene were provided and 0.45 g of the syrup was applied to the inside of each drinking straw, resulting in a coating having a thickness of 50 μm. Following drying in a low temperature drier, the straws contained a mass of 0.31 g of the coating, evenly adhered thereto. The final straw had a content of 80 mg of the black cohosh extract.

Such straws were consumed in 160 ml of chilled water (4-5° C.) over approximately 2 minutes. At the end of this time, no residue remained on the straw nor in the beverage container. The formulation and delivery masked the bitter taste of the black cohosh extract, resulting in a beverage with a pleasant flavour.

Example 5

Drinking Straw with Probiotic Coating 15.0 g of partially hydrolysed guar gum and 1.0 g methyl cellulose was combined with 30.0 g of water at ambient temperature. To this 3.0 g *bacillus coagulans* spray dried powder, 3.0 g grape flavour, 4.0 g citric acid, 2.0 g stevia sweetener, 0.5 g red colour and 0.1 g blue colour were added. The coating was mixed well to combine.

0.38 g of the resulting syrup was applied to polypropylene drinking straws, forming a coating having a thickness of 50 μm. After drying in a low temperature stirred, the film mass was 0.27 g, and was firmly and uniformly adhered to the straw. Each straw contained 2 billion CFU of the probiotic material.

The straw was fully consumed in approximately 180 ml of chilled water (4-5° C.) over approximately 2 minutes. There was no reside in the straw or glass once this volume has been consumed.

The invention hence provides internally coated drinking straws with coating comprising a gum matrix and an active agent, and methods of making the same.

The invention claimed is:

1. A drinking straw comprising an elongate tubular body of an insoluble material having an internal coating comprising matrix and one or more active agents, the one or more active agents being dispersed within the matrix, the body sized to allow a carrier liquid to be drawn therethrough such that passage of the carrier liquid causes the matrix to release the one or more active agents into the carrier liquid to be consumed by a drinker, wherein the matrix comprises a partially hydrolysed guar gum (PHGG), an acid and a modified cellulose, wherein the acid is selected from citric acid, malic acid, tartaric acid, ascorbic acid or a combination thereof, and wherein the acid comprises from 20-40% of the matrix.

2. The drinking straw according to claim 1, wherein the modified cellulose is selected from hydroxypropyl methylcellulose, hydroxypropyl cellulose, methyl ethyl cellulose, methyl cellulose and carboxymethylcellulose or a combination thereof.

3. The drinking straw of claim 1, wherein a ratio of modified cellulose: PHGG is between 1:5 and 1:20.

4. The drinking straw of claim 1, wherein the matrix comprises:
a ratio of the PHGG to the modified cellulose to the acid of 50-250:1-20:1-50.

5. The drinking straw according to claim 1, wherein the matrix comprises:
a ratio of the PHGG to the modified cellulose to the acid of 50-250:1-20:1-40.

6. The drinking straw according to claim 1, wherein the coating, once dried, has a water activity of 0.6 or less.

7. The drinking straw according to claim 1, wherein the active agent comprises a nutritional supplement, including herbal extracts, vitamins, minerals, amino acids, fatty acids, probiotics, a pharmaceutical substance, a sweetening agent, a flavouring agent, or a colouring agent, or a combination of two or more thereof.

8. A drinking straw comprising an elongate tubular body of an insoluble material having an internal coating comprising matrix and one or more active agents, the one or more active agents being dispersed within the matrix, the body sized to allow a carrier liquid to be drawn therethrough such that passage of the carrier liquid causes the matrix to release the one or more active agents into the carrier liquid to be consumed by a drinker, wherein the matrix comprises:
a ratio of a partially hydrolysed guar gum to a modified cellulose to an acid of 50-250:4-20:10-40, wherein the acid is selected from citric acid, malic acid, tartaric acid, ascorbic acid or a combination thereof, and wherein the acid comprises from 20-40% of the matrix.

9. A drinking straw comprising an elongate tubular body of an insoluble material having an internal coating comprising matrix and one or more active agents, the one or more active agents being dispersed within the matrix, the body sized to allow a carrier liquid to be drawn therethrough such that passage of the carrier liquid causes the matrix to release the one or more active agents into the carrier liquid to be consumed by a drinker, wherein the matrix consists essentially of a partially hydrolysed guar gum (PHGG), an acid and a modified cellulose, wherein the acid is selected from citric acid, malic acid, tartaric acid, ascorbic acid or a combination thereof, and wherein the acid comprises from 20-40% of the matrix.

\* \* \* \* \*